(No Model.) 3 Sheets—Sheet 1.

F. X. HOFBAUER.
ELECTRIC FAN MOTOR.

No. 529,385. Patented Nov. 20, 1894.

Witnesses:
Raphaël Netter
Edward H. Brush

Inventor
Frank X. Hofbauer
by C. A. Terry
Att'y (No Model.) 3 Sheets—Sheet 2.

F. X. HOFBAUER.
ELECTRIC FAN MOTOR.

No. 529,385. Patented Nov. 20, 1894.

Witnesses:
Raphaël Netter
Edward H. Brush

Inventor
Frank X. Hofbauer
by C. A. Terry
Attorney.

(No Model.) 3 Sheets—Sheet 3.

F. X. HOFBAUER.
ELECTRIC FAN MOTOR.

No. 529,385. Patented Nov. 20, 1894.

Witnesses:
Raphael Netter
Edward H. Brush

Inventor
Frank X. Hofbauer
by C. A. Terry
Attorney.

UNITED STATES PATENT OFFICE.

FRANK X. HOFBAUER, OF NEWARK, NEW JERSEY, ASSIGNOR, BY MESNE ASSIGNMENTS, TO THE ARMATURE BELL COMPANY, OF SAME PLACE.

ELECTRIC-FAN MOTOR.

SPECIFICATION forming part of Letters Patent No. 529,385, dated November 20, 1894.

Application filed August 1, 1894. Serial No. 519,186. (No model.)

*To all whom it may concern:*

Be it known that I, FRANK X. HOFBAUER, a citizen of the United States, residing at Newark, in the county of Essex, in the State of New Jersey, have invented certain new and useful Improvements in Electric-Fan Motors, of which the following is a specification.

My invention relates to the construction of electric fan motors.

The object of the invention is to provide a serviceable and economical form of motor, which may be operated, if desired, by low voltage currents, such for instance as produced by well known forms of batteries.

The invention consists in certain details of construction which will be described in connection with the accompanying drawings.

Figure 1:
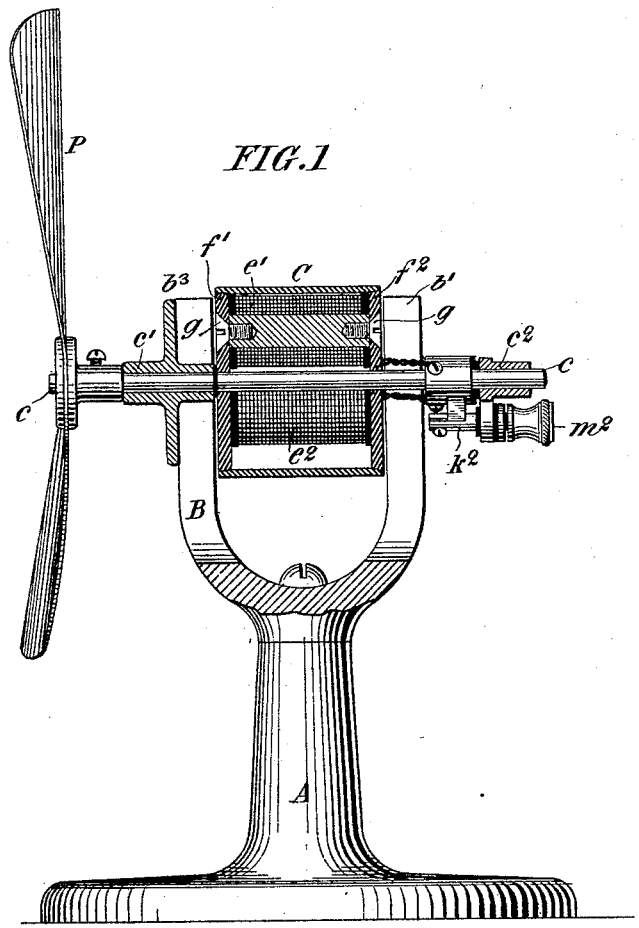
Figure 2:
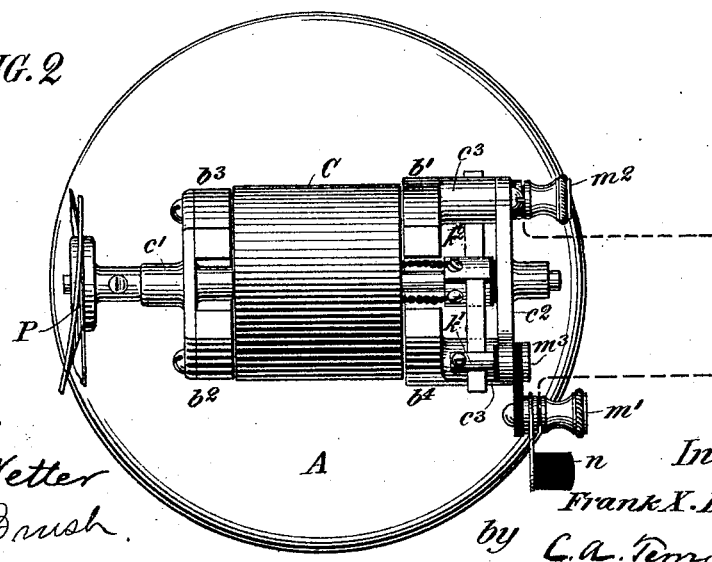
Figure 3:
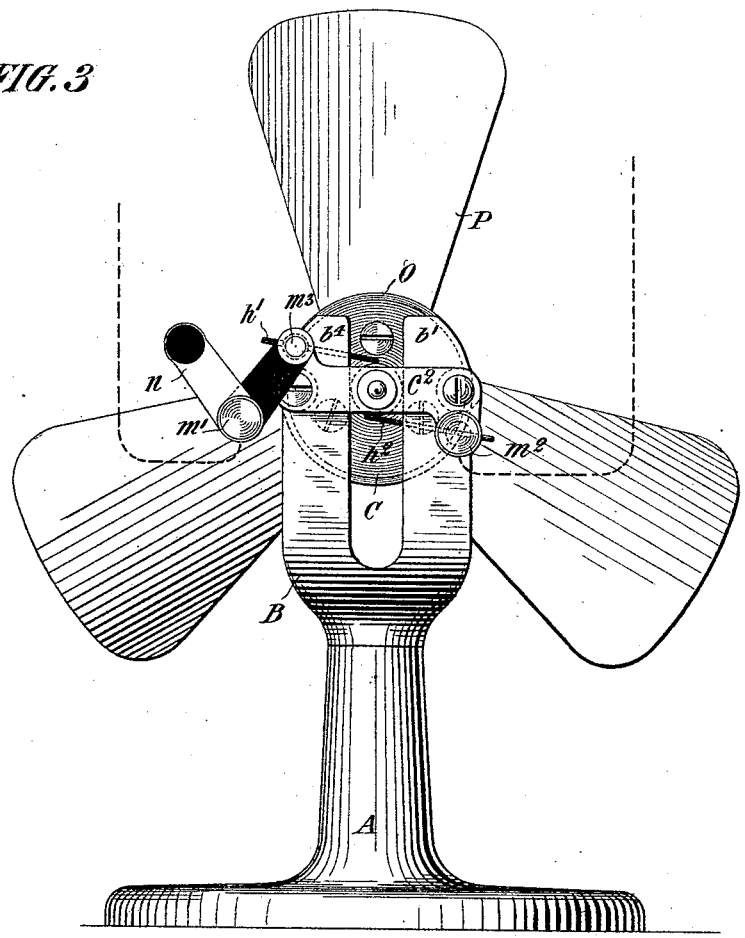
Figure 4:
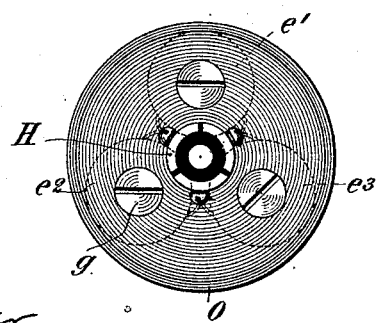
Figure 5:
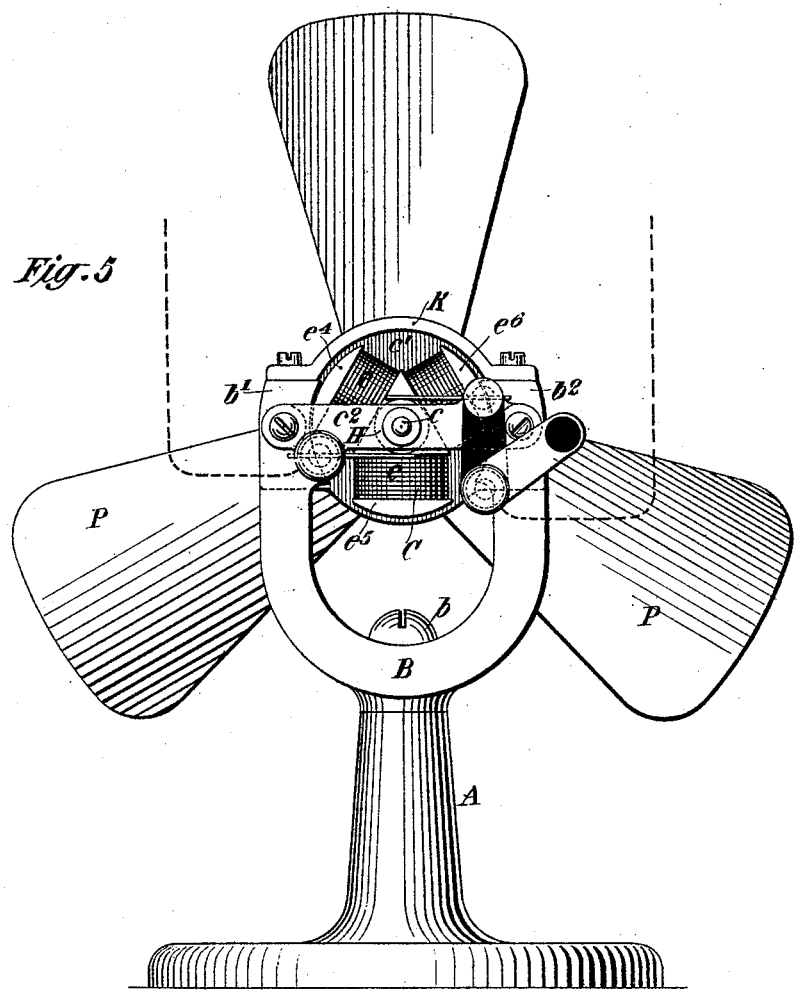
Figure 6:
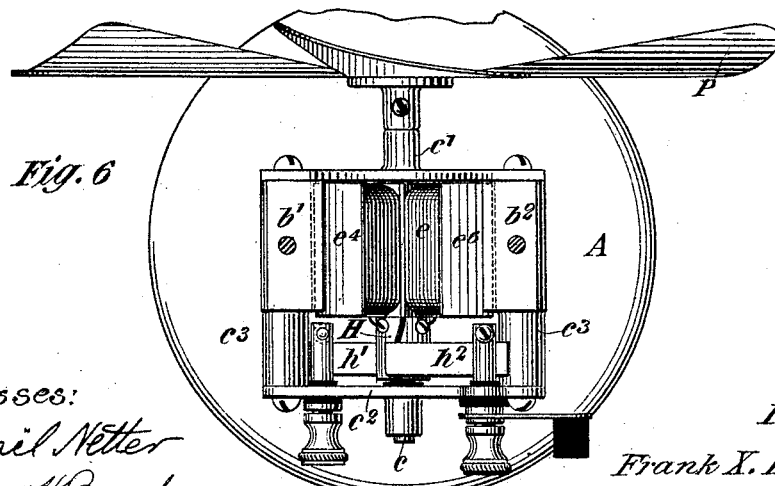

In the drawings, Figure 1 is a side elevation, partly in section, of the motor and fan. Fig. 2 is a plan. Fig. 3 is an end elevation. Fig. 4 is a detail; and Figs. 5 and 6 illustrate a modification.

Referring to the figures A represents a standard or base, upon which is carried a U shaped permanent magnet B having four pole projections $b'$, $b^2$, $b^3$ and $b^4$. The poles $b'$ and $b^3$ are of like polarity with each other and the poles $b^2$ and $b^4$ are of like polarity with each other, but opposite polarity from the poles $b'$ and $b^3$.

The armature C is mounted on a suitable shaft $c$, supported in bearings $c'$ and $c^2$ carried by the permanent magnet. The bearings $c'$ is shown as consisting of a plate secured directly to the poles $b^2$, $b^3$ of the permanent field magnet, while the bearing $c^2$ consists of a plate secured to lugs or projections $c^3$ formed upon and which may be integral with the field magnet poles $b'$ and $b^4$. The plates $c'$ and $c^2$ are of non magnetic material, such for instance as brass, and therefore do not short-circuit the poles of the field magnet. The armature itself consists of a suitable number of electro magnets $e'$, $e^2$ and $e^3$ which are shown in the drawings as being three in number, although it will be understood that this number may be varied. These magnets are shown as supported by end plates $f'$ and $f^2$, which are of non magnetic material, such for instance as fiber, by means of soft iron screws $g$ which pass through the end plates into the ends of the cores of the magnets. The heads of these screws therefore, form the polar projections of the several magnets, and they are located equidistant from each other so as to be presented in succession to the poles $b'$, $b^2$, $b^3$ and $b^4$ in a manner which will be readily understood. The terminals of the coils of the several magnets are brought out through the plate at one end of the armature to the three sections of the commutator H which is mounted upon the shaft in the usual way. Contact brushes $h'$ and $h^2$ rest against the commutator surface and serve to complete the electrical connections through the successive electro magnets as the armature revolves, at the proper times for causing the polar projections of the armature cores to be drawn toward the proper field magnet pole-projections. The commutator brushes are carried upon insulated studs $k'$ and $k^2$ which are supported on the plate $c^2$. Binding posts $m'$ and $m^2$ serve to afford electrical connections with the respective brushes. A switch $n$ is inserted between the binding post $m'$ and the contact plate, $m^3$ for making and interrupting the circuit-connections when desired. In practice I prefer to inclose the entire armature in a cylindrical cover O which serves to protect the electro magnets.

Upon the end of the armature shaft is mounted any suitable form of fan P. The coils of the armature are of suitable size and character to adapt the device for the particular current which is to be employed. In practice I have obtained excellent results by the use of from two to six cells of a gravity battery, the coils being of proper size and character therefor.

In Figs. 5 and 6 the modification is illustrated wherein a U shaped permanent magnet B is fastened by screws $b$ to the standard or base A. Between the poles $b'$ $b^2$ of this magnet the armature C is mounted on the shaft $c$ supported in the bearings $c'$, $c^2$. The bearing $c'$ is shown in this instance as being within a circular plate secured directly to the poles of the field magnet. The bearing $c^2$ consists of a narrow plate secured to the lugs $c^3$ extending from the field magnet poles. These lugs are long enough to afford room for the commutator and its brushes. A curved plate K of non-magnetic material bridges the ends of the poles of the field magnet and thus shields the armature. The plate affording the bearing $c'$ fits beneath the plate K. The armature in this instance consists of three radiating electro magnets $e^4$, $e^5$ and $e^6$, although it will be understood that the number may be varied. The ends of these magnets are expanded over the coils $e$ as shown. The terminals of the coils of the several magnets are brought to the sections of the commutator H in the usual way. The contact brushes $h'$ and $h^2$ rest upon the commutator surface as described in connection with Figs. 1, 2 and 3.

The device may be included in an electric circuit of higher voltage than furnished by a few cells of gravity or other battery. Thus for instance it may be included in a fifty volt incandescent circuit by suitable artificial resistance being placed in series therewith.

I claim as my invention—

1. An electric fan motor, consisting of a handle or support terminating in four field magnet poles, an armature mounted therein and consisting of electro magnets, having poles presented to the respective ends of the field magnet poles, and bearings for the armature shaft carried by the field magnet poles, substantially as described.

2. A fan motor consisting of an upright handle or support, having four vertically projecting poles formed in U shaped pairs, a cylindrical armature within said field magnet having opposite poles at its respective ends presented to the field magnet poles, suitable circuit connections for completing the electrical connections through the coils of the armature in succession and a fan mounted upon the armature shaft.

3. In an electric fan motor the combination of the permanent field magnet constituting an extension of the support, the plate $c^2$ carried upon the field magnet and forming a bearing for the armature shaft, and the switch or circuit controller $n$ carried by said plate, substantially as described.

4. In an electric fan motor, a field magnet consisting of a permanent magnet having upwardly extending poles and constituting an extension of the standard or support.

5. An electric fan motor, consisting of a handle or support, a permanent field magnet secured to the upper end thereof, an armature mounted therein and consisting of electro magnets, having radiating poles and bearings for the armature shaft carried by the field magnet poles, one of said bearings being formed in a circular plate, and the other in a bar secured to projections extending from the field magnet beyond the commutator.

In testimony whereof I have hereunto subscribed my name this 29th day of June, A. D. 1894.

FRANK X. HOFBAUER.

Witnesses:
S. PERIT RAWLE,
JAMES FRICKRICK KENNARD.